Oct. 9, 1923.　1,469,827
G. SILVESTRI
CONNECTION FOR CONNECTING RODS OF RECIPROCATORY ENGINES ACTING ON A COMMON CRANK
Filed Jan. 12, 1921
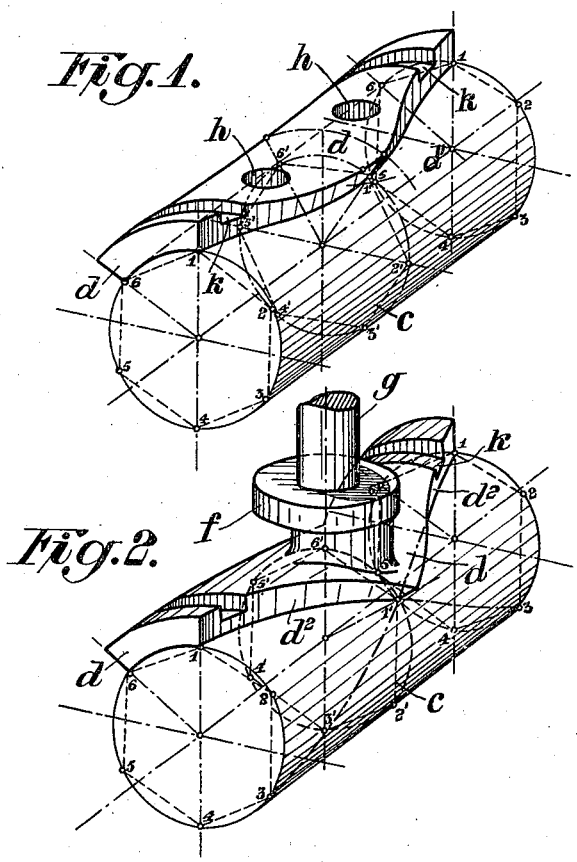
Inventors:
Guilio Silvestri
By George Bayard Jones
Atty.

Patented Oct. 9, 1923.

1,469,827

UNITED STATES PATENT OFFICE.

GIULIO SILVESTRI, OF RODAUN, NEAR VIENNA, AUSTRIA.

CONNECTION FOR CONNECTING RODS OF RECIPROCATORY ENGINES ACTING ON A COMMON CRANK.

Application filed January 12, 1921. Serial No. 436,792.

*To all whom it may concern:*

Be it known that I, GIULIO SILVESTRI, a subject of Austria, residing at Rodaun, near Vienna, in Austria, have invented a new and useful Improvement in Connections for Connecting Rods of Reciprocatory Engines Acting on a Common Crank (for which I have filed applications in Spain Mar. 20, 1920, Patent No. 73,027; in Switzerland June 21, 1920, Patent No. 92,770; in Italy June 21, 1920, Patent No. 186,601; in France July 1, 1920, Patent No. 518,525; in Belgium July 8, 1920, Patent No. 288,421; in Austria Sept. 30, 1914, Patent No. 73,755; in Sweden Nov. 13, 1916, Patent No. 46,230; in Norway Aug. 10, 1917, Patent No. 31,313; in Denmark Aug. 10, 1917, Patent No. 26,013; in Czechoslovakia Apr. 20, 1920, No. 2992/1920; in Poland May 4, 1920, No. 6409/1920; in Hungary July 8, 1920, No. 9163; and in Germany Oct. 2, 1915, No. 636,866), of which the following is a specification.

The subject of the present invention is a connection for the connecting rods of reciprocating engines acting on a common crank in which, as compared with the usual known forms of connection, a greater arc of the crank pin is embraced by the end bearing member and a better distribution of pressure is attained.

Connections of this kind, in which the boundary of the big end bearing member is a simple helix and the bearing member is engaged at the mid point by the rod, suffer from the drawback that the big end bearing member, in consequence of unilateral wear produced by a couple of forces tending to turn the bearing member transversely of the crank axis, becomes quickly worn and the rigidity and tight fit of the connection is destroyed.

In accordance with the present invention for the production of a suitable easily manufactured form of connection the big end bearing member is formed of a single piece the boundary of which comprises helices extending in opposite directions from the mid point of the generatrix or else presents a bearing surface consisting of halves arranged at an angle to one another in the manner of double helical toothing; the bearing member being covered by a transverse member to the centre of which the connecting rod is secured, or the covering being omitted and the connecting rod engaged with its forked end at the centres of gravity of the halves.

Two embodiments of the invention are shown in the drawings in which Fig. 1 shows the first mentioned embodiment in which the boundary of the bearing $d$ deviates in circumferential directions from the generatrix at the longitudinal centre $d'$ of the crank pin $c$ so that a greater arc of the circumference of the pin $c$ is embraced.

The connecting rod engages with its forked ends at holes $h$ preferably at the centre of gravity of the respective halves.

In the construction shown in Fig. 2, the connecting rod $g$ is not forked but engages a member $f$ which is connected with the connecting rod $g$ and overlies the bearing member.

If, as shown, the bearing surfaces extend from points at both ends of the pin lying in a like generatrix in the form of oppositely wound helices $d^2$ of like inclination which meet in the middle of the pin $c$ there is formed a bearing member having an edge similar to double helical toothing which is easily produced in the workshop.

I claim:

1. A connecting rod for reciprocating engines having several cylinders the pistons of which act upon a common crank, in which the surface of the head of the connecting rod bearing directly against the crank pin is shaped as a ring segment and is bounded on each side in the circumferential direction by a line which extends from points at both ends of the head lying in a like generatrix of the cylindrical bearing surface and deviates in circumferential direction from said generatrix in the middle of the head or crank pin so that a greater arc of the circumference of the pin is embraced.

2. A connecting rod for reciprocating engines having several cylinders the pistons of which act upon a common crank, in which the surface of the head of the connecting rod bearing directly against the crank pin is shaped as a ring segment and is bounded on each side in the circumferential direction by two helices of like pitch and of opposite direction meeting midway of the length of the crank pin at an angle to one another.

GIULIO SILVESTRI.